United States Patent [19]
Yamashita et al.

[11] Patent Number: 5,368,972
[45] Date of Patent: Nov. 29, 1994

[54] METHOD OF PREPARING COMPOSITE PARTICLES COMPRISING ADHERING WAX PARTICLES TO THE SURFACE OF RESIN PARTICLES

[75] Inventors: Hiroshi Yamashita, Numazu; Akihiro Kotsugai, Shizuoka; Yoichiro Watanabe, Fuji; Koichi Katoh, Numazu; Hiromitsu Kawase, Mishima, all of Japan

[73] Assignee: Ricoh Company, Ltd., Tokyo, Japan

[21] Appl. No.: 16,502

[22] Filed: Feb. 11, 1993

[30] Foreign Application Priority Data

Feb. 15, 1992 [JP] Japan ................................. 4-061338

[51] Int. Cl.$^5$ .................................................. G03G 5/00
[52] U.S. Cl. .................................... 430/137; 430/109; 430/110
[58] Field of Search ................... 430/137, 109, 110; 427/393.5

[56]         References Cited
          U.S. PATENT DOCUMENTS 5,206,109  4/1993  Anno ................................. 430/137

FOREIGN PATENT DOCUMENTS 63-300245  12/1991  Japan .

*Primary Examiner*—Steve Rosasco
*Attorney, Agent, or Firm*—Cooper & Dunham

[57] ABSTRACT

A method of preparing composite particles is disclosed, which comprises the steps of dispersing matrix organic resin particles having a polar group on a surface thereof in a hydrophilic organic liquid, water or mixture thereof to prepare a dispersion of the matrix organic resin particles; dispersing a wax in a hydrophilic organic liquid, water or mixture thereof by use of a nonionic surface active agent to prepare an emulsion of the wax; mixing the dispersion of the matrix organic resin particles and the emulsion of the wax in the presence of a surface active agent with a polarity opposite to that of the polar group on the matrix organic resin particles to obtain a dispersion in which finely-divided particles of the wax are caused to adhere to the surface of the matrix particles; and heating the dispersion to fix the finely-divided particles of the wax on the surface of the matrix organic resin particles.

20 Claims, No Drawings

METHOD OF PREPARING COMPOSITE PARTICLES COMPRISING ADHERING WAX PARTICLES TO THE SURFACE OF RESIN PARTICLES

BACKGROUND OF THE INVENTION

1. Field of the Invention

The present invention relates to a method of preparing composite particles which can be applied to a spacer for use in electronic equipment, and used as a filler in a separating column, as a molding material, as a coating material, and as microspheres used in immunoassay methods in the medical field; and a method of preparing toner particles capable of developing latent electrostatic images in the field of electrophotography, electrostatic recording or electrostatic printing.

2. Discussion of Background

In the electrophotographic process or electrostatic recording process, a latent electrostatic image is formed on a latent-electrostatic-image bearing member such as a photoconductor or a dielectric material and developed into a visible toner image by a toner. This toner, which is pulverized to an appropriate size and charged to a predetermined polarity, is regulated to form a thin film on a toner-supply-roller such as a development sleeve with the aid of a blade in a development unit. The toner image thus obtained is transferred to an image-receiving medium such as a sheet of paper or a plastic film when necessary. The transferred image is then fixed on the image-receiving medium by heating or by applying a solvent vapor. A copy image can thus be obtained.

In the above-mentioned image fixing step, an adherent fusing system using a heat-application roller is commonly used in the electrophotographic copiers. This system has the shortcoming that the fused toner which is transferred to the image-receiving medium adheres to the surface of the heat-application roller and this toner adhering to the roller is again transferred to the image-receiving medium, causing the image-receiving medium to become stained with toner. Namely, the so-called off-set phenomenon occurs. To prevent the off-set phenomenon, a toner comprising a releasing agent is conventionally known, as disclosed in Japanese Patent Publication 52-3304. To prepare such a toner, a mixture of a binder resin, releasing agent, and other additives is kneaded while heated to the melting point of the binder resin, and then cooled and pulverized.

In the above case, it is required to thoroughly knead the mixture because the compatibility of the binder resin with the releasing agent is very poor. Insufficient kneading causes phase-separation, thereby producing a dispersed phase and a continuous phase in each toner particle. When the dispersed phase comprising the releasing agent becomes large, filming of the toner on the photoconductor and the development sleeve, and adhesion to a carrier are caused. The kneading time required to prevent the above-mentioned phase-separation problem is 5 times or more the kneading time in the case of the preparation of a toner not comprising the releasing agent.

To solve the aforementioned problems on the releasing agent, Japanese Laid-Open Patent Application 63-300245 discloses a method for preparing a toner. According to this method, finely-divided particles of the releasing agent are caused to adhere only to the surface of dyed matrix resin particles in such a way that these dyed matrix resin particles are mixed with an emulsion in which the releasing agent is dispersed by use of a surface active agent. In general, however, the emulsified releasing agent can be maintained in a stable condition owing to the large quantity of the surface active agent, so that the finely-divided particles of the releasing agent cannot be uniformly attached to the surface of the matrix resin particles in the dispersion merely by mixing the emulsion of the finely-divided particles of the releasing agent and the matrix resin particles. In addition, even though the particles of the releasing agent adhere to the matrix resin particles, the releasing agent particles readily separate from the matrix particles, because the adhesion of the finely-divided particles of the releasing agent to the matrix resin particles is poor.

SUMMARY OF THE INVENTION

Accordingly, one object of the present invention is to provide a method of preparing composite particles, each particle comprising a matrix resin particle and finely-divided particles of a releasing agent which are uniformly and firmly fixed on the surface of the matrix resin particle.

Another object of the present invention is to provide toner particles for use in electrophotography, each toner particle comprising a matrix resin particle and finely-divided particles of a releasing agent uniformly and firmly fixed on the surface of the matrix resin particle, by which toner the above-mentioned conventional filming problem on the surface of a photoconductor or a development sleeve can be solved.

The above-mentioned first object of the present invention can be achieved by a method of preparing composite particles comprising the steps of (i) dispersing matrix organic resin particles having a polar group on a surface thereof in a hydrophilic organic liquid, water or mixture thereof to prepare a dispersion of the matrix organic resin particles; (ii) dispersing a wax in a hydrophilic organic liquid, water or mixture thereof by use of a nonionic surface active agent to prepare an emulsion of the wax; (iii) mixing the dispersion of the matrix organic resin particles and the emulsion of the wax in the presence of a surface active agent with a polarity opposite to that of the polar group on the matrix organic resin particles to obtain a dispersion in which finely-divided particles of the wax are caused to adhere to the surface of the matrix particles; and (iv) heating the dispersion to fix the finely-divided particles of the wax on the surface of the matrix organic resin particles.

The second object of the present invention can be achieved by a method of preparing toner particles, comprising the steps of (i) dispersing matrix organic resin particles having a polar group on a surface thereof in a hydrophilic organic liquid, water or mixture thereof to prepare a dispersion of the matrix organic resin particles; (ii) dispersing a releasing agent in a hydrophilic organic liquid, water or mixture thereof by use of a nonionic surface active agent to prepare an emulsion of the releasing agent; (iii) mixing the dispersion of the matrix organic resin particles and the emulsion of the releasing agent in the presence of a surface active agent with a polarity opposite to that of the polar group on the matrix organic resin particles to obtain a dispersion in which finely-divided particles of the releasing agent are caused to adhere to the surface of the matrix particles; and (iv) heating the dispersion to fix the finely-divided particles of the releasing agent on the surface of the matrix organic resin particles.

DESCRIPTION OF THE PREFERRED EMBODIMENTS

The matrix organic resin particles for use in the present invention have a polar group on the surface thereof. The matrix organic resin particles may physically or chemically adsorb a low-molecular weight or high-molecular weight compound with a polar group such as a carboxyl group, a sulfone group, a phosphone group, an amino group, an amide group or a quaternary amino group. Alternatively, the matrix organic resin particles may be originally made of a polymer with a polar group. In the former case, it is not desirable that the above-mentioned compound with a polar group be easily separated from the matrix particles when the matrix particles were dispersed in a dispersion medium such as a hydrophilic organic liquid, water or a mixture thereof in preparation of composite particles according to the method of the present invention.

According to the present invention, finely-divided particles of the wax are caused to adhere to the surface of the above-mentioned matrix organic resin particles. The volume mean diameter of each matrix organic resin particle is preferably 1 to 20 μm, and it is proper that the volume mean diameter of the matrix particles be 10 times or more that of the finely-divided particles of the emulsified wax.

The high-molecular weight compounds which are attached to the surface of the matrix organic resin particles, or made into the matrix organic resin particles are preferably polymers obtained by polymerization of a monomer with a polar group.

The aforementioned monomers with a polar group for use in the present invention are divided into two groups, an anionic vinyl monomer and a cationic vinyl monomer.

Preferable examples of the anionic vinyl monomer are an unsaturated carboxylic acid monomer, an unsaturated sulfonic acid monomer, and an unsaturated phosphoric acid monomer.

Specific examples of the unsaturated carboxylic acid monomer are acrylic acid, methacrylic acid, crotonic acid, itaconic acid and maleic acid; half esters such as monobutyl itaconate, monomethyl maleate, monobutyl maleate, and monooctyl maleate; fumaric acid, citraconic acid, cinnamic acid, butene tricarboxylic acid, 3-butenoic acid, 4-pentenoic acid, and tetrahydroterephthalic acid; and anhydrides of unsaturated dibasic acid such as maleic anhydride, and itaconic anhydride.

Specific examples of the unsaturated sulfonic acid monomer are styrene sulfonic acid, 2-acrylamide-2-methylpropane sulfonic acid, 3-sulfopropyl acrylate, 3-sulfopropyl methacrylate, bis-(3-sulfopropyl)-itaconate, and sulfuric monoester of 2-hydroxyethyl acrylic acid or 2-hydroxyethyl methacrylic acid; and allylsulfosuccinic acid, octyl allylsulfosuccinate, vinyl sulfonate, 2-sulfoethyl acrylate and 2-sulfoethyl methacrylate, and salts of the above monomers.

Specific examples of the unsaturated phosphoric acid monomer are vinyl phosphonic acid, vinyl phosphate, acid phosphoxyethyl acrylate, acid phosphoxyethyl methacrylate, 3-chloro-2-acid phosphoxypropyl acrylate, 3-chloro-2-acid phosphoxypropyl methacrylate, acid phosphoxypropyl acrylate, acid phosphoxypropyl methacrylate, bis(methacryloxyethyl) phosphate, diphenyl-2-acryloyloxyethyl phosphate, dibutyl-2-methacryloyloxyethyl phosphate, dibutyl-2-acryloyloxyethyl phosphate, dioctyl-2-acryloyloxyethyl phosphate, dioctyl-2-methacryloyloxyethyl phosphate, and mono-(2-methacryloyloxyethyl)acid phosphate.

Preferable examples of the cationic vinyl monomer are acrylic ester or methacrylic ester of an amino-group-containing aliphatic alcohol; acrylic amide or methacrylic amide, and acrylic ester or methacrylic ester and acrylic amide or methacrylic amide which are mono- or di-substituted by an alkyl group at the nitrogen atom; a vinyl compound substituted by a nitrogen-containing heterocyclic group; N,N-diallyl-alkylamine; styrene having mono- or di-alkylamino group; a vinyl ether having mono- or di-alkylamino group; and quaternary monomers of the aforementioned monomers.

Examples of the acrylic ester or methacrylic ester of amino-group-containing aliphatic alcohol are N,N-dimethylaminoethyl acrylate, N,N-dimethyiaminoethyl methacrylate, N,N-diethylaminoethyl acrylate, N,N-diethylaminoethyl methacrylate, 3-dimethylaminophenyl acrylate, 3-dimethylaminophenyl methacrylate, N,N-dimethylaminopropyl acrylate, N,N-dimethylaminopropyl methacrylate, N,N-diethylaminopropyl acrylate, N,N-diethylaminopropyl methacrylate and N-methylaminoethyl methacrylate.

Examples of the acrylic amide or methacrylic amide, and the acrylic amide or methacrylic amide which is mono- or di-substituted by an alkyl group at the nitrogen atom are acrylic amide, methacrylic amide, N-butyl acrylamide, N,N-dibutyl acrylamide, piperidine acrylamide, N-(N',N'-dimethylaminoethyl)acrylamide, N-(N',N'-dimethylaminoethyl) methacrylamide, N-butyl methacrylamide, N,N-dimethylacrylamide, N-octadecyl acrylamide, N-(N',N'-diethylaminoethyl) acrylamide, N-(N',N'-diethylaminoethyl)methacrylamide, N-(N',N'-dimethylaminopropyl)acrylamide N-(N',N'-dimethylaminopropyl)methacrylamide, N-(N',N'-diethylaminopropyl) acrylamide, N-(N',N'-diethylaminopropyl)methacrylamide, diacetone acrylamide, N-hydroxymethyl acrylamide, N-methylaminoethyl acrylamide, and N-methylamino methacrylamide.

Examples of the vinyl compound substituted by a nitrogen-containing heterocyclic group are vinylpyridine, vinylpyrrolidone, and 2-methyl-5-vinylpyridine, 2-ethyl-5-vinylpyridine.

Examples of N,N-diallyl alkylamine are N,N-diallyl methylamine, and N,N-diallyl ethylamine.

Examples of the alkylamino-group-containing styrene are N,N-dimethylaminomethyl styrene, N,N-dimethylaminoethyl styrene, and N,N-diethylaminoethyl styrene.

Examples of the alkylamino-group-containing vinyl ether are 2-dimethylaminoethyl vinyl ether, and 2-diethylaminoethyl vinyl ether.

In addition to the above, quaternary monomers of the aforementioned monomers obtained by using a conventional quaternary-compound-producing agent can be used. Examples of the quaternary-compound-producing agent include dialkyl sulfate having an alkyl group with 4 carbon atoms or less; alkyl ester of alkylsulfonic acid or arylsulfonic acid having an alkyl group with 18 carbon atoms or less, such as methanesulfonic acid, benzenesulfonic acid, or toluenesulfonic acid; halogenated benzyl such as benzyl chloride, or benzyl bromide; and halogenated alkyl having an alkyl group with 18 carbon atoms or less.

The matrix organic resin particles classified in a narrow particle size distribution are preferably employed in the present invention because the wax emulsion particles can uniformly adhere to the surface of each matrix particle when the dispersion of the matrix resin particles and the wax emulsion are mixed.

The particle size distribution of the matrix organic resin particles can be expressed by the ratio of the volume mean diameter (dv) to the number mean diameter (dn) in accordance with Coulter counter method. More specifically, using 30,000 or more sample particles, the size and the number of the particles are measured by commercially available "Coulter multisizer" (Trademark) with a 100 μm diameter aperture tube, made by Coulter Electronics Co., Ltd., with the aperture current level being automatically controlled. The preferable particle size distribution of the matrix organic resin particles for use in the present invention is within the range of $1.00 \leq (dv)/(dn) \leq 1.20$.

To prepare the particles of a polymer classified in a narrow particle size distribution, the dispersion polymerization method proposed by Yamashita et al., in U.S. Pat. No. 4,885,350 is preferably used. More specifically, a high-molecular dispersant is dissolved in an amount of 0.1 to 10 wt. % in water, a hydrophilic organic liquid, or a mixture thereof to prepare a solution. A vinyl monomer, which is soluble in the above-mentioned solvent, but insoluble therein when the monomer is turned into a polymer, is added to the above prepared solution to carry out the polymerization. Thus, a dispersion of the vinyl polymer particles classified in a narrow particle size distribution can be obtained.

Examples of the aforementioned vinyl monomer include styrene and styrene derivatives such as o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene; acrylic acid derivatives and methacrylic acid derivatives such as methyl acrylate, ethyl acrylate, butyl acrylate, isobutyl acrylate, propyl acrylate, n-octyl acrylate, dodecyl acrylate, lauryl acrylate, 2-ethylhexyl acrylate, stearyl acrylate, 2-chloroethyl acrylate, phenyl acrylate, methyl α-chloroacrylate, β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylic acid ester, diethylene glycol monomethacrylic acid ester, glycerin monoacrylic acid ester, glycerin monomethacrylic acid ester, methyl methacrylate, ethyl methacrylate, propyl methacrylate, n-butyl mathacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate, diethylaminoethyl methacrylate, acrylonitrile, methacrylonitrile, and acrylamide; vinyl alcohol or ethers thereof such as vinyl methyl ether, vinyl ethyl ether, and vinyl propyl ether; esters of vinyl alcohol and carboxyl-group-containing compound, such as vinyl acetate, vinyl propionate, and vinyl butyrate; and halogenated vinyl compounds such as vinyl chloride, vinylidene chloride, vinyl bromide, and vinyl fluoride.

These monomers can be used alone or in combination. Alternatively, a mixture comprising the above-mentioned monomers in an amount of 50 wt. % or more and other copolymerizable monomers can be used in the present invention.

In the course of the dispersion polymerization process, when a polar polymer is used as the high-molecular dispersant, the obtained particles of the vinyl polymer strongly adsorb the above-mentioned polar polymer, and these particles of the vinyl polymer can be used for the matrix organic resin particles in the present invention. As a matter of course, the matrix organic resin particles for use in the present invention can be obtained by subjecting the previously mentioned monomers with a polar group to this dispersion polymerization.

In the above-mentioned dispersion polymerization of the vinyl monomers, water, a hydrophilic organic liquid or a mixture thereof can be used. Examples of the hydrophilic organic liquid include alcohols such as methyl alcohol, ethyl alcohol, modified- ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, cyclohexanol, furfuryl alcohol, tetrahydrofurfuryl alcohol, ethylene glycol, glycerin, and diethylene glycol; and ether alcohols such as methyl cellosolve, Cellosolve solvent, isopropyl cellosolve, butyl cellosolve, ethylene glycol monomethyl ether, ethylene glycol monoethyl ether, diethylene glycol monomethyl ether, and diethylene glycol monoethyl ether.

These hydrophilic organic liquids can be used alone or in combination. The hydrophilic organic liquid, water or a mixture thereof serves as a dispersion medium (hereinafter referred to as a dispersion medium A) for a dispersion of the matrix organic resin particles. Water and the same hydrophilic organic liquids as mentioned above can also be used as a dispersion medium (hereinafter referred to as a dispersion medium B) to prepare a wax emulsion to be described later.

When the above-mentioned alcohols or ether alcohols are used in combination with other organic liquids to prepare the dispersion medium A, it is possible to control the adhesion uniformity of the wax particles to the matrix particles and the adhesion strength between the above two particles. Namely, the degree of swelling of the matrix particles with respect to the dispersion medium A can be changed by selecting a proper solubility parameter (SP) of the employed dispersion medium A, provided that the above-mentioned organic liquids used with the alcohols or ether alcohols do not dissolve the matrix organic resin particles.

Examples of the above-mentioned organic liquid which can be used in combination with the alcohols or ether alcohols are as follows: hydrocarbons such as hexane, octane, petroleum ether, cyclohexane, benzene, toluene, and xylene; halogenated hydrocarbons, such as carbon tetrachloride, trichloroethylene, and tetrabromoethane; ethers such as ethyl ether, dimethyl glycol, trioxane, and tetrahydrofuran; acetals such as methylal, and diethyl acetal; ketones such as acetone, methyl ethyl ketone, methyl isobutyl ketone, and cyclohexane; esters such as butyl formate, butyl acetate, ethyl propionate, and Cellosolve acetate; acids such as formic acid, acetic acid, and propionic acid; and sulfur-containing organic compounds and nitrogen-containing organic compounds such as nitropropene, nitrobenzene, dimethylamine, monoethanolamine, pyridine, dimethyl sulfoxide, and dimethylformamide.

When the composite particles prepared by the method of the present invention are applied to toner particles for use in electrophotography, a thermoplastic resin is preferably used for the matrix particle from the viewpoint of the fixing performance to a sheet of paper. It is preferable that the thermoplastic resin have a glass transition temperature of 40° to 90° C. and a weight-average molecular weight of 5,000 to 1,000,000, and contain a high-molecular weight component with a molecular weight of 1,000,000 or more and a crosslinking component in an amount of 5 to 50 wt. % when the fixing performance of toner by means of a heat-application roller and the resistance to the off-set phenomenon are taken into consideration.

The wax emulsion for use in the present invention can be obtained by dispersing a wax in a hydrophilic organic liquid, water or a mixture thereof (dispersion medium B) by use of a nonionic surface active agent serving as an emulsifier. To prepare such a wax emulsion, the following methods can be employed:

(1) A wax is previously dissolved in a liquid which is compatible with a dispersion medium B such as a hydrophilic organic liquid, water or a mixture thereof. An emulsifier is dissolved in the dispersion medium B, and the wax solution is added with quickly stirring to the dispersion medium B, whereby finely-divided particles of the wax separate out in the dispersion medium B.

(2) An emulsifier is dissolved in a melt of a wax. A heated dispersion medium B is added to the melt of the wax, and a mixture thus obtained is cooled.

(3) A wax is added to a dispersion medium B which dissolves an emulsifier therein and dispersed by the application of a mechanical force in a ball mill, colloid mill or sand mill.

It is preferable that the wax emulsion be dispersed until the volume mean diameter of the wax particles reached 0.01 to 0.5 μm to prepare the uniform composite particles.

Preferable examples of the wax for use in the present invention are as follows:

(1) vegetable waxes: candelilla wax, carnauba wax, rice wax, and Japan wax.

(2) animal waxes: bees wax, lanolin, and spermaceti.

(3) mineral waxes: montan wax, ozokerite, and ceresin.

(4) petroleum waxes: paraffin wax, microcrystalline wax, and petrolatum.

(5) synthetic coal waxs: montanic acid wax, montanic ester wax, montanic partially saponified ester wax, and montanic soft wax.

(6) synthetic fat-and-oil type waxes: (i) Fischer-Tropsch wax; (ii) hardened castor oil; (iii) 12-hydroxystearic acid and derivatives thereof such as 12-hydroxystearic acid amide, N-(2-hydroxyethyl)-12-hydroxystearic acid amide, N,N'-ethylenebis-12-hydroxystearic acid amide, N,N'-hexamethylenebis-12-hydroxystearic acid amide, N,N'-xylylenebis-12-hydroxystearic acid amide, methyl 12-hydroxystearate, butyl 12-hydroxystearate, propylene glycol mono-12-hydroxystearate, glycerin mono-12-hydroxystearate, ethylene glycol mono-12-hydroxystearate, glycerin tri-12-acetoxystearate, lithium 12-hydroxystearate, and calcium 12-hydroxystearate; (iv) fatty acid amides such as lauric acid amide, stearic acid amide, oleic amide, erucic amide, and ricinoleic acid amide; (v) fatty acid amide derivatives such as N-substituted fatty acid amides, for example, N,N'-ethylenebislauric acid amide, N,N'-methylenebisstearic acid amide, N,N'-ethylenebisstearic acid amide, N,N'-ethylenebisoleic amide, N,N'-ethylenebisbehenic acid amide, N,N'-ethylenebis-12-hydroxystearic acid amide, N,N'-butylenebisstearic acid amide, N,N'-hexamethylenebisstearic acid amide, N,N'-hexamethylenebisoleic amide, N,N'-xylylenebisstearic acid amide, stearic acid monomethylol amide, coconut oil fatty acid monoethanol amide, stearic acid diethanol amide, N-oleyl stearic acid amide, N-oleyl oleic amide, N-stearyl stearic acid amide, N-stearyl oleic amide, N-oleyl palmitic acid amide, N-stearyl erucic amide, N,N'-dioleyl adipic acid amide, N,N'-distearyl adipic acid amide, N,N'-dioleyl sebacic acid amide, N,N'-distearyl sebacic acid amide, N,N'-distearyl terephthalic acid amide, and N,N'-distearyl isophthalic acid amide; (vi) aliphatic amines such as dodecylamine, tetradecylamine, octadecylamine, oleyl amine, and dioctadecylamine; (vii) fatty esters of monohydric alcohol such as methyl laurate, methyl myristate, methyl palmitate, methyl stearate, methyl coconut oil fatty acid, isopropyl myristate, butyl stearate, octadecyl stearate, and oleyl oleate; (viii) fatty esters of polyhydric alcohol, for example, fatty ester of glycerin such as glycerin monostearate, glycerin monooleate, and glycerin docosanoate, fatty ester of sorbitan such as sorbitan monopalmitate, sorbitan monostearate, sorbitan tristearate, and sorbitan monooleate, fatty ester of propylene glycol such as propylene glycol monopalmitate and propylene glycol monostearate, fatty ester of ethylene glycol such as ethylene glycol monostearate, and fatty ester of polyoxyethylene such as polyxyethylene monostearate; (ix) metallic salts: higher fatty acid metallic salts such as calcium stearate, aluminum stearate, magnesium stearate and calcium palmitate; alkaline earth metallic salts; zinc salt; and aluminum salt; (x) hydrazide of higher fatty acid: palmitic acid hydrazide, and stearic acid hydrazide; (xi) higher fatty acid p-hydroxyanilide: myristic acid p-hydroxyanilide, and stearic acid p-hydroxyanilide; (xii) hydrochloride of higher fatty acid β-diethylaminoethyl ester: hydrochloride of β-diethylaminoethyl laurate, and hydrochloride of β-diethylaminoethyl stearate; (xiii) higher fatty amide-formaldehyde condensate: stearic acid amide-formaldehyde condensate, and palmitic acid amide-formaldehyde condensate; and (xiv) halogenated hydrocarbon: chlorinated paraffin, and chlorinated propylene.

Specific examples of the nonionic surface active agent used for preparation of the wax emulsion include polyoxyethylene adducts such as alkyl polyoxyethylene ether, polyoxypropylene ether, fatty acid polyoxyethylene ester, fatty acid polyoxyethylene sorbitan ester, fatty acid polyoxyethylene sorbitol ester, polyoxyethylene castor oil, alkyl polyoxyethylene amine, and alkyl polyoxyethylene amide; polyhydroxy alcohols or alkylolamides such as fatty acid sorbitan ester, fatty acid polyglycerin ester, and fatty acid sucrose ester; silicone surface-active agents such as a polyether-modified silicone compound, alkylaralkyl-polyether-modified silicone compound, epoxy-polyether-modified silicone compound, alcohol-modified silicone compound, fluorine-modified silicone compound, amino-modified silicone compound, mercapto-modified silicone compound, epoxy-modified silicone compound, and allyl-modified silicone compound; fluorine-containing surface-active agents such as perfluoroalkylethyleneoxide adducts; and other surface-active agents such as a glycolipid-containing biosurfactant, and a surfactant having a polymer chain.

The previously mentioned dispersion of the matrix organic resin particles and the wax emulsion are mixed in the presence of a surface active agent with a polarity opposite to that of the polar group on the matrix organic resin particles. In the course of this mixing step, a dispersion of finely-divided particles of a thermoplastic organic resin may be added to the above two dispersions. The particle diameter of the finely-divided thermoplastic resin particles is preferably 0.5 μm or less, and this dispersion can be obtained by carrying out emulsion polymerization, soap-free emulsion polymerization or finely-divided suspension polymerization in water, a hydrophilic organic liquid or a mixture thereof. Examples of the above-mentioned thermoplastic organic resin are acrylic resin, polyester resin, epoxy resin, silicone resin, vinylidene fluoride resin, and polytetrafluoroethytene resin.

When the dispersion of the finely-divided thermoplastic resin particles is also mixed with the dispersion of the matrix resin particles and the wax emulsion, not only the wax particles, but also the finely-divided thermoplastic resin particles are attached to the surface of the matrix resin particles.

Examples of the nonionic surface active agent used in the course of the mixing step are as follows:

1. Cationic surface-active agents
   (1) alkylamine salts or acylamine salts: primary amine salt, acyl aminoethyl amine salt, N-alkyl polyalkylene polyamine salt, and fatty acid polyethylene polyamide, and other amides and amine salts.
   (2) quaternary ammonium salts or amide-bond-containing ammonium salts: alkyl trimethylammonium salt, diaikyl dimethylammonium salt, alkyl dimethylbenzyl ammonium salt, alkyl pyridium salt, acyl aminoethyl methyl diethylammonium salt, acyl aminopropyl dimethylbenzylammonium salt, acyl aminopropyl diethylhydroxyethylammonium salt, acyl aminoethyl pyridium salt, and diacyl aminoethylammonium salt.
   (3) ammonium salts containing ester or ether linkage: diacyloxy ethylmethylhydroxyethyl ammonium salt, and alkyloxymethyl pyridinium salt.
   (4) imidazoline or imidazolium salts: alkyl imidazoline, 1-hydroxyethyl-2-alkyl imidazoline, and 1-acylaminoethyl-2-alkyl imidazolium salt.
   (5) amine derivetives: alkyl polyoxyethylene amine, N-alkyl aminopropyl amine, N-acyl polyethylene polyamine, acyl polyethylene polyamine, and fatty acid triethanolamine ester.
   (6) other surfactants: a glycolipid-containing biosurfactant and a surfactant having a polymer chain.
2. Anionic surface-active agents
   (1) salts of carboxylic acid: fatty acid salt, rhodinic acid salt, naphthenic acid salt, ether carboxylic acid salt, alkenyl succinic acid salt, N-acyl sarcosine salt, N-acyl glutamic acid salt, salt of primary alkyl sulfate, salt of secondary alkyl sulfate, and salt of alkyl polyoxyethylene sulfate.
   (2) salts of sulfate: salt of alkyl phenylpolyoxyethylene sulfate, salt of monoacyl glycerin sulfate, salt of acylamino sulfate, sulfuted oil, and sulfated fatty acid alkyl ester.
   (3) salts of sulfuric acid: salt of α-olefin sulfonic acid, salt of secondary alkane sulfonic acid, salt of α-sulfo fatty acid, salt of acylisethionic acid, salt of N-acyl-N-methyl aminoethanesulfonic acid, salt of dialkyl sulfosuccinic acid, salt of alkylbenzenesulfonic acid, salt of alkylnaphthalenesulfonic acid, salt of alkyldiphenyl ether disulfonic acid, salt of petroleum sulfonic acid, and salt of lignin sulfonic acid.
   (4) salts of phosphoric ester: salt of alkyl phosphate and salt of alkyl polyoxyethylene phosphate.
   (5) silicone surface-active agents: sulfonic-acid-modified silicone compound and carboxyl-modified silicone compound.
   (6) fluorine-containing surface-active agents: salt of perfluoroalkyl carboxylic acid, salt of perfluoroalkyl sulfonic acid, perfluoroalkyl phosphoric ester, and perfluoroalkyl trimethylammonium salt.
   (7) other surface-active agents: a glycolipid-containing biosurfactant, and a surfactant having a polymer chain.

The aforementioned nonionic surface active agent may be previously added to the dispersion of the matrix organic resin particles, and then the wax emulsion is added to the above dispersion. Alternatively, the nonionic surface active agent may be added to the mixture of the dispersion of the matrix organic resin particles and the wax emulsion. By the addition of the nonionic surface active agent with a polarity opposite to that of the polar group on the matrix particles, the finely-divided particles of the wax are attached to the surface of the matrix organic resin particles.

It is preferable that the amount of the wax emulsion, in terms of a solid content, and the amount of the nonionic surface active agent be respectively in the range of 0.1 to 10 wt. %, and 0.01 to 2 wt. % of the total weight of the matrix resin particles. When the above-mentioned amount ratio is satisfied, the finely-divided particles of the wax can be caused to uniformly adhere to the surface of the matrix resin particles.

The reason why the finely-divided particles of the wax are uniformly attached to the surface of the matrix organic resin particles has not yet been clarified. It is believed that the matrix resin particles ionically adsorb the nonionic surface active agent to neutralize the surface charge of the matrix organic resin particles. Consequently, the dispersion stability of the matrix organic resin particles is lowered, and coalescence between different kinds of particles, that is, the matrix particle and the wax particle is caused, and thus the finely-divided particles of the wax are caused to uniformly adhere to the surface of the matrix organic resin particles. In the course of the mixing step, there is a possibility of causing coalescence between the matrix organic resin particles. The problem of the coalescence of the matrix organic resin particles can be solved by selecting the proper amount of the nonionic surface active agent and the method of adding the surface active agent, and controlling the particle size and amount of the matrix organic resin particles and the wax emulsion.

The thus obtained dispersion in which finely-divided particles of the wax are caused to adhere to the surface of the matrix organic resin particles is heated to the melting point of the above-mentioned wax, or the glass transition temperature or softening point of the matrix organic resin particles. As a result, the finely-divided particles of the wax are firmly fixed on the surface of the matrix resin particles, thereby preventing the separation of the wax particles from the matrix resin particles. Thus, composite particles can be obtained.

When necessary, the composite particles may be separated from the dispersion by solid-liquid separation by use of a centrifugal separator or decanter, repeated washing in order to remove the surface active agent and the wax particles which remain unattached to the matrix particles in the dispersion.

After this purification step, the composite particles may be dried. In the course of the drying step, the finely-divided particles of the wax emulsion may be fixed on the surface of the matrix organic resin particles by the application of heat thereto.

The present invention will now be explained in detail by referring to the case where the method for preparing the composite particles of the present invention is applied to the preparation of toner particles used in the field of electrophotography.

For preparing the toner particles, the matrix organic resin particles are uniformly dyed in their entirety with a dye in the course of, or after preparation of the dispersion of the matrix resin particles. This dyeing step can be carried out, for example, by dispersing the matrix organic resin particles in an organic liquid and dissolving a dye in the organic liquid. Thus, the dye is caused to permeate through the matrix resin particles in their entirety. Alternatively, the dye may be added to the organic liquid before the matrix particles are dispersed therein. It is preferable that the solubility of the dye in the above-mentioned organic liquid ($D_1$) and the solubility of the dye in the organic resin for use in the matrix particles ($D_2$) satisfy the relationship of $(D_1)/(D_2) \leq 0.5$. In the present invention, it is unnecessary to remove the organic liquid after the dyeing step. The dyed matrix resin particles can be effectively prepared in this way.

The dye used for dyeing the matrix resin particles is not limited as long as the above-mentioned relationship between the two solubilities of the employed dye is satisfied. A vat dye, a disperse dye, and an oil-soluble dye are preferred to a water-soluble dye such as a cationic dye or an anionic dye because the environmental stability of the former dyes is superior, and the resistivity of the toner comprising the matrix particles dyed with the former dyes is not lowered, so that the image transferable ratio is not decreased in the image formation process. In particular, the oil-soluble dye is preferably employed in the present invention.

In addition, a plurality of dyes can be used in combination in accordance with a desired color tone of the toner image. The amount ratio by weight of the dye to the matrix organic resin particles may be freely determined depending on the degree of pigmentation, and in general, it is preferable that the amount of the dye be 1 to 50 parts by weight to 100 parts by weight of the matrix organic resin particles.

For instance, when an alcohol such as methanol or ethanol, and a mixture of water and the alcohol, which show a high solubility parameter, are used as the organic liquid and a styrene-acrylic resin with a solubility parameter of about 9 is used as the organic resin for the matrix particles, the following dyes can be preferably employed:

C.I. Solvent Yellow (6, 9, 17, 31, 35, 100, 102, 103, 105),

C.I. Solvent Orange (2, 7, 13, 14, 66),

C.I. Solvent Red (5, 16, 17, 18, 19, 22, 23, 143, 145, 146, 149, 150, 151, 157, 158), C.I. Solvent Violet (31, 32, 33, 37), C.I. Solvent Blue (22, 63, 78, 83, 84, 85, 86, 91, 94, 95, 104), C.I. Solvent Green (24, 25), and C.I. Solvent Brown (3, 9).

In addition to the above, the following commercially available dyes can be employed:

Aizen Sot Yellow-1, 3, 4, Aizen Sot Orange-1, 2, 3, Aizen Sot Scarlet-1, Aizen Sot Red-1, 2, 3, Aizen Sot Brown-2, Aizen Sot Blue-1, 2, Aizen Sot Violet-1, Aizen Sot Green-1, 2, 3, and Aizen Sot Black-1, 4, 6, 8 (Trademark), made by Hodogaya Chemical Co., Ltd.; Sudan Yellow-140, 150, Sudan Orange-220, Sudan Red-290, 380, 460, and Sudan Blue-670 (Trademark), made by BASF Japan Ltd.; Diaresin Yellow-3G, F, H2G, HG, HC, HL, Diaresin Orange-HS, G, Diaresin Red-GG, S, HS, A, K, H5B, Diaresin Violet-D, Diaresin Blue-J, G, N, K, P, H3G, 4G, Diaresin Green-C, and Diaresin Brown-A (Trademark), made by Mitsubishi Chemical Industries, Ltd.; Oil Color Yellow-3G, GG-S, #105, Oil Color Orange-PS, PR, #201, Oil Color Scarlet-#308, Oil Color Red-5B, Oil Color Brown-GR, #416, Oil Color Green-BG, #502, Oil Color Blue-BOS, HN, and Oil Color Black-HBB, #803, EE, EX (Trademark), made by Orient Chemical Industries, Ltd.; Sumiplast Blue GP, OR, Sumiplast Red FB, 3B, and Sumiplast Yellow FL7G, GC (Trademark), made by Sumitomo Chemical Co.,Ltd.; Kayaron, Polyester Black EX-SH300, Kayaset Blue A-2R and Kayaset Red-B (Trademark), made by Nippon Kayaku Co., Ltd.

As a matter of course, the dye for use in the present invention is not limited to the above because the dye can be appropriately selected in accordance with the combination of the matrix organic resin particles and the organic liquid.

Alternatively, after the completion of polymerization of the matrix organic resin particles, the dye may be directly added to a slurry of the polymerized matrix resin particles in the hydrophilic organic liquid, water or a mixture thereof, and the mixture thus obtained may be heated to the previously mentioned temperature with stirring. In this case, much care is required not to heat the mixture over the glass transition temperature of the matrix organic resin particles to prevent the resin particles from being fused to each other.

Furthermore, in the case where the composite particles of the present invention are applied to the toner particles, a dispersion of finely-divided particles of a thermoplastic organic resin, serving as a binder agent, may be further added to the dispersion of the matrix organic resin particles and the wax emulsion, serving as a releasing agent, in the course of the mixing step. By the addition of the above-mentioned dispersion of the binder agent, not only the wax particles, but also the finely-divided particles of the binder agent can be attached to the surface of each matrix particle. In this case, the wax particles can be prevented from separating from the matrix particles, and the amount of the wax particles attached to each matrix resin particle can be controlled owing to the finely-divided thermoplastic resin particles, so that the thermal fixing properties of the obtained toner can be improved. The binder agent can be selected from the conventionally known thermoplastic resins. The proper particle size of the binder agent is 1 μm or less. It is preferable that the amount of the binder agent in terms of a solid content be in the range of 0 to 300 wt. % of the total weight of the wax.

In addition, the hydrophobic nature, the triboelectric chargeability, the environmental resistance and the fluidity of the obtained toner can be remarkably improved when a fluoroalkyl-group-containing surface active agent is used as the nonionic surface active agent in the course of mixing step.

Specific examples of the fluoroalkyl-group-containing surface active agent are as follows:

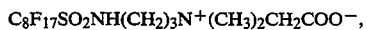

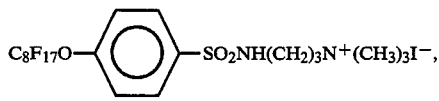

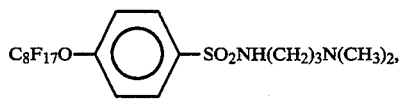

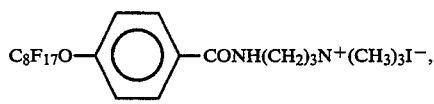

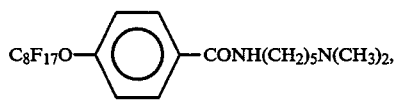

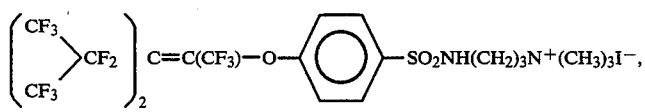

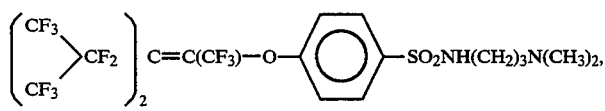

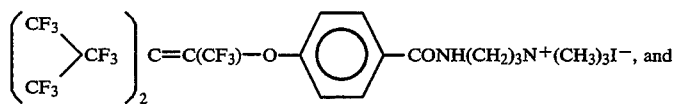

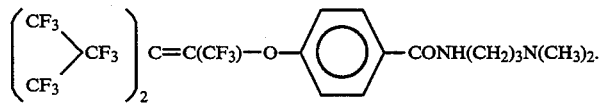

In addition to the fluoroalkyl-group-containing surface active agents represented by the above formulas, fluoroalkyl ($C_2$–$C_{10}$) carboxylic acid and metal salts thereof, N-perfluorooctane sulfonyl disodium glutamate, 3-[fluoroalkyl($C_8$–$C_{11}$)oxy]-1-sodium alkyl(-$C_3$–$C_4$) sulfonate, 3-[ω-fluoroalkanoyl($C_6$–$C_8$)-N-ethylamino]-1-sodium propanesulfonate, fluoroalkyl($C_{11}$–$C_{20}$) carboxylic acid and metallic salts thereof, perfluoroalkyl ($C_7$–$C_{13}$) carboxylic acid and metallic salts thereof, perfluoroalkyl($C_4$–$C_{12}$) sulfonic acid and metallic salts thereof, perfluorooctane sulfonic acid diethanol amide, N-propyl-N-(2-hydroxyethyl)perfluorooctane sulfonamide, perfluoroalkyl($C_8$–$C_{10}$) sulfonamide propyl trimethylammonium salt, perfluoroalkyl($C_8$–$C_{10}$)-N-ethylsulfonyl glycine salt, monoperfluoroalkyl(-$C_8$–$C_{18}$) ethyl phosphate N-[3-(perfluorooctanesulfoneamide)propyl]-N,N-dimethy-N-carboxymethylene ammonium betaine, and bis(N-perfluorooctylsulfonyl-N-ethylaminoethyl phosphate.

Furthermore, for preparation of toner particles, additive components may be added to the composite particles prepared by the method of the present invention when necessary. For example, hydrophobic silica and metallic oxides such as titanium oxide and alumina can be used as fluidity-imparting agents; and finely-divided particles of polyvinylidene fluoride and zinc stearate can be used as lubricants.

Other features of this invention will become apparent in the course of the following description of exemplary embodiments, which are given for illustration of the invention and are not intended to be limiting thereof.

EXAMPLE 1

Step of Preparation of Dispersion of Matrix Organic Resin Particles 100 parts by weight of methanol and 2 parts by weight of a commercially available methyl vinyl ether-maleic anhydride copolymer "GANTREZ AN-119" (Trademark), made by GAF Corporation were placed into a separable flask equipped with a condenser, a nitrogen-introducing tube, a stainless-steel turbine agitator having four impeller blades with angles of 45°, a motor, a dropping funnel and a thermometer.

The flask was put into a constant-temperature water bath designed to maintain the temperature within ±0.1° C. of a preset temperature. The mixture was stirred at 100 rpm at a temperature of 65° C. for 2 hours, and the copolymer was thus partially esterified to be dissolved in methanol. The mixture was cooled to 5° C. and nitrogen was introduced into the reaction system through the nitrogen-introducing tube. The oxygen in the reaction system was replaced by nitrogen until the concentration of oxygen reached 0.1 vol. % or less in such a manner that the oxygen concentration was detected by an oxygen analyzer of Galvanic cell type.

The following components were further placed into the flask through the dropping funnel:

|  | Parts by Weight |
|---|---|
| Styrene | 22 |
| Methyl acrylate | 18 |
| t-dodecylmercaptan | 0.1 |
| 1,3-butanediol dimethacrylate | 0.6 |

Stirring of the reaction mixture was continued, and when the concentration of oxygen in the reaction system was lowered to 0.1 vol. % or less, the temperature of the water bath was increased to 65° C.

When the temperature of the reaction mixture in the flask was raised to 60° C., a mixture of 0.1 parts by weight of methanol and 0.006 parts by weight of 2,2'-azobisisobutyronitrile was added to the reaction mixture with a microsyringe. After about 30 minutes, the reaction was initiated and the reaction mixture became milky white. Thereafter, the milky white degree of the mixture further increased while the reaction mixture was allowed to stand for 30 minutes. A mixture of 10 parts by weight of methanol and 0.6 parts by weight of 2,2'-azobisisobutyronitrile was added to the reaction mixture through the dropping funnel over a period of 10 minutes.

The polymerization reaction was continued for 5 hours, and then a mixture of 0.4 parts by weight of α-thioglycerol and 0.6 parts by weight of 1,3-butanediol dimethacrylate was added to the reaction mixture with a syringe.

The polymerization reaction was further continued for 10 hours. Thereafter, a mixture of 10 parts by weight of styrene and 25 parts by weight of methanol was added to the reaction mixture through the dropping funnel over a period of one hour.

After the completion of the addition of the methanol solution, the reaction was continued for 10 hours, so that a dispersion of matrix organic resin particles was obtained. The volume mean diameter (dv) and the number mean diameter (dn) of these resin particles were respectively 5.05 μm and 4.98 μm, so that the ratio (dv)/(dn) was 1.015, and the particles were substantially spherical.

A small amount of the above prepared dispersion, which was used as a sample, was diluted with a large excess of ion-exchange water in a screw vial. After centrifugal sedimentation, the supernatant liquid was removed from the dispersion. This process was repeated seven times, and the sample dispersion was air-dried and then dried under reduced pressure. Thus, particles of the polymer were obtained. In accordance with the x-ray photoelectron spectroscopy (XPS) by use of a commercially available analyzer "ESCALAB 5" (Trademark), made by VG Corporation, it was confirmed that these particles had a carboxyl group on their surface.

The interfacial electrokinetic potential of these polymer particles was −62 mV when measured by use of a commercially available "DELSA 440" (Trademark), made by Coulter Electronics, Co., Ltd.

Step of Dyeing the Matrix Organic Resin Particles 20 parts by weight of methanol and 2 parts by weight of acetone were added to 2 parts by weight of a commercially available dye "Oil Black 860" (Trademark), made by Orient Chemical Industries, Ltd. The dye was dissolved in the above mixed solvent by the application of heat thereto, and then this solution was cooled. The dye solution thus obtained was caused to pass through a filter with a pore size of 1 μm to obtain a filtrate.

To 10 parts by weight of the filtrate thus prepared, 40 parts by weight of the previously obtained dispersion of the matrix organic resin particles and 10 parts by weigh of distilled water were added, and the mixture was stirred at 50° C. for 2 hours. Thereafter the dispersion was cooled to room temperature and subjected to centrifugal sedimentation to remove the supernatant liquid from the dispersion. The rest was dispersed with a mixed solvent consisting of 50 parts by weight of methanol and 50 parts by weight of water. This dispersing process was repeated three times. Thus, a dispersion of the dyed matrix organic resin particles was prepared.

Step of Preparation of Wax Emulsion 20 parts by weight of carnauba wax were put into a hermetically sealable container and caused to melt by heating to 100° C. One part by weight of a nonionic surface active agent, polyoxyethylenenonylphenyl ether with an average addition mole number of oxyethylene of 15, was added to the carnauba wax with stirring and completely dissolved therein. Thereafter, 75 parts by weight of hot water of 98° C. were gradually added to the above prepared mixture of the carnauba wax and the surface active agent with stirring at high speed by use of a homomixer, followed by further stirring for 10 minutes. After the mixture was cooled to 25° C. with stirring, the mixture was allowed to stand for 6 hours without stirring. The sediment was removed from the mixture to prepare an emulsion of carnauba wax. The volume mean diameter of the emulsified carnauba wax was 0.31 μm when measured by a commercially available dynamic light-scattering photometer "DLS700" (Trademark), made by Otsuka Denshi Co., Ltd. The interfacial electrokinetic potential of the carnauba wax emulsion was −23 mV.

Step of Preparation of Dispersion of Finely-Divided Particles of Thermoplastic Resin 1880 parts by weight of ion-exchange water were placed into a separable flask equipped with a condenser, a nitrogen-introducing tube, a stainless-steel turbine agitator having four impeller blades with angles of 45°, a motor, a dropping funnel and a thermometer, and heated to 75° C. After the concentration of oxygen in the reaction system was decreased to 0.5 vol. % or less by replacing the atmosphere with nitrogen, 20 parts by weight of methyl methacrylate were added to the ion-exchange water at one time through the dropping funnel with stirring at 200 rpm. Then, the mixture was allowed to stand for 2 hours, and the following components were added dropwise to the mixture over a period of one hour:

|  | Parts by Weight |
| --- | --- |
| Ion-exchange water | 120 |
| Potassium persulfate | 1.08 |
| Sodium styrenesulfonate | 0.0384 |

The above prepared reaction mixture was stirred for 3 hours, so that a slightly milky white dispersion was obtained. The following components were added dropwise to the dispersion over a period of 15 minutes:

|  | Parts by Weight |
| --- | --- |
| Ion-exchange water | 87 |
| Potassium persulfate | 2.08 |

Furthermore, the following components were added dropwise to the dispersion over a period of 4 hours:

|  | Parts by Weight |
| --- | --- |
| Styrene | 80 |
| n-butyl methacrylate | 60 |
| methyl methacrylate | 60 |

After continuous stirring and heating for 10 hours, the dispersion was cooled. This dispersion was filtered through a 400-mesh filter to remove coarse particles therefrom. Thus, a dispersion of finely-divided particles of the thermoplastic resin was prepared. It was observed by a scanning-type electron microscope that the volume mean diameter of these resin particles was 0.25 μm.

Step of Mixing Dispersion of Dyed Matrix Organic Resin Particles, Wax Emulsion and Dispersion of Finely-Divided Particles of Thermoplastic Resin Stearylamine acetate serving as a cationic surface active agent was dissolved in water to prepare a 0.1% aqueous solution of stearylamine acetate.

The interfacial electrokinetic potential of the previously obtained dyed matrix organic resin particles was at first −60 mV. As the aqueous solution of stearylamine acetate was added to the dispersion of the dyed matrix resin particles, the interfacial electrokinetic potential of the matrix particles was gradually approaching to 0 mV, and the negative interfacial electrokinetic potential was decreased. With the addition of the aqueous solution of stearylamine acetate in an amount of 0.2 wt. % of the total weight of the dyed resin particles, the negative interfacial electrokinetic potential of the matrix resin particles was decreased to −30 mV, and with the addition of that in an amount of 0.4 wt. % of the total weight of the dyed resin particles, the negative interfacial electrokinetic potential of the matrix particles was decreased to 0 mV.

The previously obtained dispersion of the dyed matrix organic resin particles was diluted with water so as to have a solid content of 10 wt. %. Likewise, the wax emulsion and the dispersion of the finely-divided particles of the thermoplastic resin were separately diluted with water and sufficiently stirred so as to have a solid content of 5 wt. %.

The dispersion of the finely-divided particles of the thermoplastic resin and the dispersion of the matrix resin particles were mixed in such a fashion that the amount of the finely-divided particles of the thermoplastic resin was 10 wt. % of the solid content of the dyed matrix resin particles. While this mixture was stirred at 25° C., the above obtained stearylamine acetate aqueous solution was gradually added thereto in such a manner that the amount of stearylamine acetate was 0.2 wt. % of the solid content of the dyed matrix resin particles, and then the mixture was stirred at 25° C. for one hour. Subsequently, with stirring the above mixture at 25° C., the wax emulsion was gradually added thereto in such a manner that the amount of the solid content of the wax component was 6 wt. % of the solid content of the dyed matrix resin particles. Thus, a dispersion of composite particles was obtained. When the composite particles thus obtained were observed by the scanning type electron microscope, the finely-divided particles of the wax, and the finely-divided particles of the thermoplastic resin were uniformly attached to the surface of the dyed matrix organic resin particles.

Then, the dispersion of the composite particles was heated at 60° C. for 2 hours with stirring, so that the composite particles were obtained according to the method of the present invention.

Finally, the composite particles thus obtained were separated from the dispersion by centrifugal separation. At this time, the supernatant liquid was clear, whereby it was confirmed that the finely-divided particles of the wax or the thermoplastic resin were not separated from the surface of the matrix resin particles. After the cycle of centrifugal separation and washing with water was repeated three times, the dispersion of the composite particles was filtered with suction and dried under reduced pressure to isolate the composite particles. The supernatant liquid after repeated centrifugal separation and the filtrate after filtration were clear, and there were no particles of the wax or the thermoplastic resin therein.

Furthermore, to fix the finely-divided particles of the wax and the thermoplastic resin on the surface of the dyed matrix organic resin particles more firmly, 100 parts by weight of the above obtained composite particles were caused to rotate at 7,500 rpm for 3 minutes in a commercially available apparatus "Hybridizer NHS-1" (Trademark), made by Nara Machinery Co., Ltd.

0.75 parts by weight of hydrophobic silica serving as a fluidity-imparting agent were added to the above obtained composite particles and they were mixed in a mixer for 30 seconds, so that toner particles according to the present invention were prepared.

The volume mean diameter (dv) and the number mean diameter (dn) of the thus prepared toner particles were respectively 5.25 μm and 4.91 μm, so that the ratio of (dv)/(dn) was 1.069.

EXAMPLE 2

The procedure for preparation of the carnauba wax emulsion in Example 1 was repeated except that the amount of polyoxyethylenenonylphenyl ether serving as a nonionic surface active agent was changed from 1 to 5 parts by weight, so that a carnauba wax emulsion was prepared. The volume mean diameter of the obtained carnauba wax emulsion was 0.13 μm when measured by the same commercially available dynamic light-scattering photometer as used in Example 1.

Using the above obtained carnauba wax emulsion, toner particles were prepared in the same manner as in Example 1.

The volume mean diameter (dv) and the number mean diameter (dn) of the thus prepared toner particles were respectively 5.20 μm and 5.02 μm, so that the ratio of (dv)/(dn) was 1.035. The interfacial electrokinetic potential of the toner was −15 mV.

EXAMPLES 3-1 to 3-4

The procedure for preparation of the toner particles in Example 1 was repeated except that the amount ratio of the solid content of the wax emulsion to the solid content of the dyed matrix organic resin particles was changed as shown in Table 1 in mixing the dispersion of the dyed matrix organic resin particles, the wax emulsion and the dispersion of the finely-divided particles of the thermoplastic resin.

The volume mean diameter (dv) and the number mean diameter of each of the thus obtained toner particles are also shown in Table 1.

TABLE 1

| | Amount Ration of Wax Emulsion to Matrix Resin Particles | dv (μm) | dv (μm) | dv/dn |
|---|---|---|---|---|
| Ex. 3-1 | 0.3 wt. % | 5.08 | 4.98 | 1.021 |
| Ex. 3-2 | 1.0 wt. % | 5.12 | 4.98 | 1.028 |
| Ex. 3-3 | 2.0 wt. % | 5.18 | 5.04 | 1.027 |
| Ex. 3-4 | 4.0 wt. % | 5.20 | 5.07 | 1.025 |

EXAMPLE 4

Step of Preparation of Dispersion of Matrix Organic Resin Particles

The procedure for preparation of the dispersion of the matrix organic resin particles employed in Example 1 was repeated except that the mixture of 10 parts by weight of styrene and 25 parts by weight of methanol used in Example 1 was replaced by a mixture of 10 parts by weight of styrene, 25 parts by weight of methanol and one part by weight of methacrylic acid and this mixture was added to the reaction mixture through the dropping funnel over a period of one hour.

After the completion of the addition of the methanol solution, the reaction was continued for 10 hours, so that a dispersion of the matrix organic resin particles was obtained.

The thus obtained matrix organic resin particles were dyed with a commercially available dye "Oil Black 860" (Trademark), made by Orient Chemical Industries, Ltd., in the same manner as in Example 1.

The same wax emulsion and the same dispersion of finely-divided particles of the thermoplastic resin were separately prepared in the same manner as in Example 1.

Step of Mixing Dispersion of Dyed Matrix Organic Resin Particles, Wax Emulsion and Dispersion of Finely-Divided Particles of Thermoplastic Resin A commercially available cationic surface active agent "Megafac 150" (Trademark), made by Dainippon Ink & Chemicals, Inc., was dissolved in water to prepare a 1.0% aqueous solution of the surface active agent.

The previously obtained dispersion of the dyed matrix organic resin particles was diluted with water so as to have a solid content of 10 wt. %. Likewise, the wax emulsion and the dispersion of the finely-divided particles of the thermoplastic resin were separately diluted with water and sufficiently stirred so as to have a solid content of 5 wt. %.

The dispersion of the finely-divided particles of the thermoplastic resin and the dispersion of the dyed matrix resin particles were mixed in such a fashion that the amount of the finely-divided particles of the thermoplastic resin was 10 wt. % of the solid content of the dyed matrix resin particles. While this mixture was stirred at 25° C., the above obtained aqueous solution of the cationic surface active agent was gradually added thereto in such a manner that the amount of the cationic surface active agent was 0.6 wt. % of the solid content of the dyed matrix resin particles, and then the mixture was stirred at 25° C. for one hour. Subsequently, with stirring the above mixture at 25° C., the wax emulsion was gradually added thereto in such a manner that the amount of the solid content of the wax component was 6 wt. % of the solid content of the dyed matrix resin particles. Thus, a dispersion of composite particles was obtained.

Then, the dispersion of the composite particles was heated at 50° C. for one hour with stirring to firmly fix the finely-divided particles of the wax and the thermoplastic resin on the surface of the dyed matrix organic resin particles. Thus the composite particles were obtained according to the method of the present invention. In this case, the fixing treatment by use of the commercially available apparatus "Hybridizer NHS-1" (Trademark), made by Nara Machinery Co., Ltd., was not carried out.

Using the above prepared composite particles, toner particles were prepared in the same manner as in Example 1.

The volume mean diameter (dv) and the number mean diameter (dn) of the thus prepared toner particles were respectively 5.27 μm and 5.11 μm, so that the ratio of (dv)/(dn) was 1.031.

EXAMPLE 5

Step of Preparation of Dispersion of Matrix Organic Resin Particles

The procedure for preparation of the dispersion of the matrix organic resin particles employed in Example 1 was repeated except that the mixture of 10 parts by weight of styrene and 25 parts by weight of methanol used in Example 1 was replaced by a mixture of 10 parts by weight of styrene, 25 parts by weight of methanol and 0.5 parts by weight of 2-acrylamide-2-methylpropane sulfonic acid, and this mixture was added to the reaction mixture through the dropping funnel over a period of one hour.

After the completion of the addition of the methanol solution, the reaction was continued for 10 hours, so that a dispersion of the matrix organic resin particles was obtained.

The thus obtained matrix organic resin particles were dyed with a commercially available dye "Oil Black 860" (Trademark), made by Orient Chemical Industries, Ltd., in the same manner as in Example 1.

The same wax emulsion was prepared in the same manner as in Example 1.

Step of Mixing Dispersion of Dyed Matrix Organic Resin Particles and Wax Emulsion A cationic surface active agent of the following formula was dissolved in a mixed solvent consisting of water and methanol with a amount ratio by weight of 1:1 to prepare a 0.1% aqueous solution of the surface active agent:

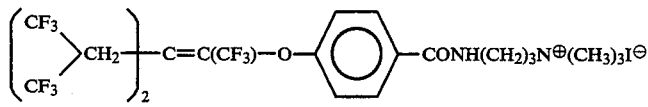

The previously obtained dispersion of the dyed matrix organic resin particles was diluted with water so as to have a solid content of 10 wt. %. Likewise, the wax emulsion was diluted with water and sufficiently stirred so as to have a solid content of 5 wt. %.

While the dispersion of the dyed matrix resin particles was stirred at 25° C., the above obtained solution of the cationic surface active agent was gradually added thereto in such a manner that the amount of the cationic surface active agent was 0.9 wt. % of the solid content of the dyed matrix resin particles, and then the mixture was stirred at 25° C. for one hour. Subsequently, with stirring the above mixture at 25° C., the wax emulsion was gradually added thereto in such a manner that the amount of the solid content of the wax component was 6 wt. % of the solid content of the dyed matrix resin particles. Thus, a dispersion of composite particles was obtained. The finely-divided particles of the wax emulsion were caused to adhere to the surface of the matrix particles.

Then, the dispersion of the composite particles was heated at 50° C. for one hour with stirring to firmly fix the finely-divided particles of the wax on the surface of the dyed matrix organic resin particles. Thus the composite particles were obtained according to the method of the present invention.

Using the above prepared composite particles, toner particles were prepared in the same manner as in Example 1.

In this case, the fixing treatment by use of the commercially available apparatus "Hybridizer NHS-1" (Trademark), made by Nara Machinery Co., Ltd., was not carried out.

The volume mean diameter (dv) and the number mean diameter (dn) of the thus prepared toner particles were respectively 5.19 μm and 5.08 μm, so that the ratio of (dv)/(dn) was 1.021.

EXAMPLE 6

Step of Preparation of Dyed Matrix Organic Resin Particles

A mixture of the following components was melt by the application of heat thereto and kneaded in a roll mill:

|  | Parts by Weight |
|---|---|
| Styrene-butyl methacrylate-2-ethylhexyl acrylate copolymer (made by Fujikura Kasei Co., Ltd.) | 80 |
| Styrene-butyl acrylate-acrylic acid copolymer (product by solution polymerization) | 20 |
| Carbon Black "C#44" (Trademark), made by Mitsubishi Chemical Industries, Ltd. | 7 |
| Change controlling agent "Bontron E-84" (Trademark), made by Orient Chemical Industries, Ltd. | 2 |

The thus obtained mixture was cooled, pulverized in an air jet mill and subjected to air classification, so that dyed matrix organic resin particles were obtained.

Step of Mixing Dyed Matrix Resin Particles and Wax Emulsion

The same carnauba wax emulsion as prepared in Example 1 was diluted with ion-exchange water so as to have an aqueous solution with a solid content of 5 wt. %.

The previously obtained dyed matrix organic resin particles and the wax emulsion were mixed in such a fashion that the amount of the finely-divided particles of carnauba wax was 6 wt. % of the total weight of the dyed matrix resin particles. While this mixture was stirred at room temperature, a 0.1% aqueous solution of stearylamine acetate was gradually added to the mixture, so that a dispersion of composite particles was prepared. According to observation by an optical microscope, the finely-divided particles of the carnauba wax were attached to the entire surface of each matrix resin particle when the amount of stearylamine acetate attained to 0.15 wt. % of the total weight of the dyed matrix resin particles. Then, the dispersion of the composite particles was heated at 60° C. for one hour to fix the finely-divided particles of carnauba wax on the surface of the dyed matrix resin particles.

Thereafter, the dispersion of the composite particles was purified by repeating a cycle of centrifugal sedimentation, removal of the supernatant liquid and dispersing in ion-exchange water three times. The supernatant liquid was clear any time after centrifugal sedimentation, which proved that the finely-divided particles of carnauba wax serving as a releasing agent were not separated from the surface of the dyed matrix resin particles.

The dispersion obtained after the final centrifugal sedimentation was filtered with suction. The resulting product was air-dried, and then dried under reduced pressure until a constant weight was reached.

The thus obtained composite particles were mixed with hydrophobic silica in an amount of 0.3 wt. % of the weight of the composite particles, whereby toner particles were prepared.

The volume mean diameter (dv) and the number mean diameter (dn) of the thus prepared toner particles were respectively 7.42 μm and 5.21 μm, so that the ratio of (dv)/(dn) was 1.424.

3 parts by weight of each toner obtained in Examples 1 to 6 and 97 parts by weigh of silicone-resin-coated ferrite carrier with a particle diameter of 70 μm were stirred and mixed in a ball mill for 20 minutes to prepare a developer. The thus obtained developer was supplied to a commercially available copying apparatus "IMAGIO 420" (Trademark), made by Ricoh Company, Ltd., to form an image sample on a sheet of copy paper. The image sample was taken out from the copying apparatus before the image sample passed an image fixing process by stopping the operation of the copying apparatus. The image sample which was taken out from the copying apparatus was fixed on the copy paper by use of an image-fixing Teflon roller not coated with silicone oil, with the image fixing temperature of the roller being changed.

The fixing properties of the developer were evaluated in terms of the following items:

(1) Hot off-set resistance

This item was evaluated by raising the temperature of the image-fixing roller and expressed by a temperature of the roller at which a hot off-set phenomenon was observed. The higher this temperature, the wider the temperature region in which the image-fixing was possible.

(2) Releasability

When the toner image formed on the copy paper was pressed by the image-fixing roller for image-fixing, the fused toner image adhered to the roller. After the image-fixing, the fused toner image was separated from the image-fixing roller by means of a separator. In the case where the releasability of the toner image was poor, the toner image took a scratch caused by the separator.

This evaluation item was expressed by a temperature of the image-fixing roller at which the scratch by the separator was not observed. The lower this temperature, the superior in the releasability of the developer.

(3) Image-fixing performance

This item was expressed by a temperature of the image-fixing roller at which the toner image formed on the copy paper was completely fixed thereon. More specifically, toner images were fixed on the copy paper with the temperature of the image-fixing roller changed. Then, the fixed toner image was rubbed at random by use of an image fixing evaluation tester to obtain the image-fixing temperature.

When this temperature was low, it was considered that the image fixing was achieved by the application of a small amount of thermal energy.

Furthermore, each developer was evaluated in terms of the following items:

(4) Reproducibility

Using the same copying apparatus as employed in the above evaluation, a standard original bearing a picture and characters was reproduced on a copy sheet. The resolution of the reproduced image obtained on the copy sheet was visually inspected with reference to five scales of limit samples.

5: Excellent
4: Good
3: Normal
2: Poor
1: Very poor (5) Decrease of charge quantity The charge quantity of toner at the initial stage was measured by the blow-off method. After making of 10,000 copies, the charge quantity of toner was also measured, and the decrease ratio was calculated in accordance with the following formula:

$$\frac{q_i - q_{ii}}{q_i} \times 100;$$

Wherein $q_i$ represents the charge quantity (μC/g) at the initial stage and $q_{ii}$ represents the charge quantity (μC/g) after making of 10,000 copies.

(6) Degree of environmental variability of charge quantity

The degree of environmental variability of charge quantity of toner was calculated in accordance with the following formula:

$$[q_1 - q_2 / \{\tfrac{1}{2}(q_1 + q_2)\}] \times 100;$$

wherein $q_1$ represents the charge quantity (μC/g) at 10° C. and 15% relative humidity; and $q_2$ represents the charge quantity (μC/g) at 30° C. and 90% relative humidity.

When the degree of environmental variability of charge quantity was low, the toner was considered to have improved environmental stability and capable of producing clear images regardless of the environmental conditions.

(7) Cleaning properties

In the same copying apparatus as employed in the above evaluation, 100 copies were made using a whole solid black image sample with A3 size. In the course of cleaning process for the 101st sheet, the operation of the copying apparatus was stopped and a photoconductor was taken out from the copying apparatus. The toner remaining on the photoconductor, which was not removed by a cleaning blade was collected by use of an adhesive tape. The amount of the toner adhering to the adhesive tape was visually inspected and the cleaning properties of the developer were evaluated in accordance with the following scale:

5: Excellent
4: Good
3: Normal
2: Poor
1: Very poor

The results of the above-mentioned evaluation of developers are shown in Table 2.

TABLE 2

| Items(*) | (1) | (2) | (3) | (4) | (5) | (6) | (7) |
|---|---|---|---|---|---|---|---|
| Example 1 | 220 | 130 | 150 | 5 | 30 | 72 | 5 |
| 2 | 230 | 115 | 140 | 5 | 28 | 98 | 5 |
| 3-1 | 190 | 150 | 115 | 5 | 13 | 35 | 4 |
| 3-2 | 200 | 140 | 120 | 5 | 18 | 39 | 4.5 |
| 3-3 | 210 | 130 | 125 | 5 | 21 | 49 | 5 |
| 3-4 | 215 | 130 | 130 | 5 | 23 | 65 | 5 |
| 4 | 230 | 120 | 140 | 5 | 2 | 20 | 5 |
| 5 | 230 | 115 | 140 | 5 | 3 | 1 | 5 |
| 6 | 220 | 115 | 145 | 3 | 28 | 36 | 5 |

(*)The items (1) to (7) correspond to the numbers mentioned in the previous description on the evaluation of developers.

As can be seen from the results of evaluation shown in Table 2, when the composite particles of the present invention are applied to the toner particles, the releasability of toner is improved because the finely-divided particles of wax are uniformly and firmly fixed to the surface of the matrix resin particles.

The matrix organic resin particles for the toner particles are classified in a narrow particle size distribution, so that the image quality of the obtained toner image is upgraded.

In addition, when the fluoroalkyl-group-containing surface active agent is used in mixing the matrix resin particles and the wax emulsion, the environmental resistance of the obtained toner is superior as shown in the results of Example 5.

What is claimed is:

1. A method of preparing composite particles comprising the steps of;
   (i) dispersing matrix organic resin particles having a polar group on a surface thereof in a hydrophilic organic liquid, water or mixture thereof to prepare a dispersion of said matrix organic resin particles,
   (ii) dispersing a wax in a hydrophilic organic liquid, water or mixture thereof by use of a nonionic surface active agent to prepare an emulsion of said wax,
   (iii) mixing said dispersion of said matrix organic resin particles and said emulsion of said wax in the presence of a surface active agent with a polarity opposite to that of said polar group on said matrix organic resin particles to obtain a dispersion in which finely-divided particles of said wax are caused to adhere to said surface of said matrix organic resin particles, and
   (iv) heating said dispersion to fix said finely-divided particles of said wax on said surface of said matrix organic resin particles.

2. The method of preparing composite particles as claimed in claim 1, further comprising the steps of separating said composite particles from said dispersion by solid-liquid separation, washing said composite particles, and drying the same after said heating step.

3. The method of preparing composite particles as claimed in claim 1, wherein a dispersion of finely-divided particles of an organic thermoplastic resin in a hydrophilic organic liquid, water or a mixture thereof is added to said dispersion of said matrix organic resin particles and said emulsion of said wax in said mixing step.

4. The method of preparing composite particles as claimed in claim 1, further comprising a step of uniformly dyeing said matrix organic resin particles in their entirety after preparation of said dispersion of said matrix organic resin particles.

5. The method of preparing composite particles as claimed in claim 1, further comprising a step of uniformly dyeing said matrix organic resin particles in their entirety during preparation of said dispersion of said matrix organic resin particles.

6. The method of preparing composite particles as claimed in claim 1, wherein said surface active agent with a polarity opposite to that of said polar group on said matrix organic resin particles has a fluoroalkyl group.

7. The method of preparing composite particles as claimed in claim 1, wherein said matrix organic resin particles have a volume mean diameter of 1 to 20 $\mu$m.

8. The method of preparing composite particles as claimed in claim 1, wherein particle size distribution of said matrix organic resin particles in terms of the ratio of volume mean diameter to number mean diameter of said matrix particles is in the range of 1.00 to 1.20.

9. The method of preparing composite particles as claimed in claim 1, wherein said finely-divided particles of said wax emulsion have a volume mean diameter of 0.01 to 0.5 $\mu$m.

10. The method of preparing composite particles as claimed in claim 1, wherein the amount of said wax emulsion in terms of a solid content is in the range of 0.1 to 10 wt. % of the total weight of said matrix organic resin particles, and the amount of said surface active agent with a polarity opposite to that of said polar group on said matrix organic resin particles is in the range of 0.01 to 2 wt. % of the total weight of said matrix organic resin particles in said mixing step.

11. A method of preparing toner particles, comprising the steps of:
    (i) dispersing matrix organic resin particles having a polar group on a surface thereof in a hydrophilic organic liquid, water or mixture thereof to prepare a dispersion of said matrix organic resin particles;
    (ii) dispersing a releasing agent in a hydrophilic organic liquid, water or mixture thereof by use of a nonionic surface active agent to prepare an emulsion of said releasing agent;
    (iii) mixing said dispersion of said matrix organic resin particles and said emulsion of said releasing agent in the presence of a surface active agent with a polarity opposite to that of said polar group on said matrix organic resin particles to obtain a dispersion in which finely-divided particles of said releasing agent are caused to adhere to said surface of said matrix organic resin particles; and
    (iv) heating said dispersion to fix said finely-divided particles of said releasing agent on said surface of said matrix organic resin particles.

12. The method of preparing toner particles as claimed in claim 11, further comprising the steps of separating said toner particles from said dispersion by solid-liquid separation, washing said toner particles, and drying the same after said heating step.

13. The method of preparing toner particles as claimed in claim 11, wherein a dispersion of finely-divided particles of an organic thermoplastic resin in a hydrophilic organic liquid, water or a mixture thereof is added to said dispersion of said matrix organic resin particles and said emulsion of said releasing agent in said mixing step.

14. The method of preparing toner particles as claimed in claim 11, further comprising a step of uniformly dyeing said matrix organic resin particles in their entirety after preparation of said dispersion of said matrix organic resin particles.

15. The method of preparing toner particles as claimed in claim 11, further comprising a step of uniformly dyeing said matrix organic resin particles in their entirety during preparation of said dispersion of said matrix organic resin particles.

16. The method of preparing toner particles as claimed in claim 11, wherein said surface active agent with a polarity opposite to that of said polar group on said matrix organic resin particles has a fluoroalkyl group.

17. The method of preparing toner particles as claimed in claim 11, wherein said matrix organic resin particles have a volume mean diameter of 1 to 20 $\mu$m.

18. The method of preparing toner particles as claimed in claim 11, wherein particle size distribution of said matrix organic resin particles in terms of the ratio of volume mean diameter to number mean diameter of said matrix particles is in the range of 1.00 to 1.20.

19. The method of preparing toner particles as claimed in claim 11, wherein said finely-divided particles of said releasing agent emulsion have a volume mean diameter of 0.01 to 0.5 μm.

20. The method of preparing toner particles as claimed in claim 11, wherein the amount of said emulsion of said releasing agent in terms of a solid content is in the range of 0.1 to 10 wt. % of the total weight of said matrix organic resin particles, and the amount of said surface active agent with a polarity opposite to that of said polar group on said matrix organic resin particles is in the range of 0.01 to 2 wt. % of the total weight of solid content of said matrix organic resin particles in said mixing step.

* * * * *